(12) United States Patent
Ryu et al.

(10) Patent No.: US 11,864,274 B2
(45) Date of Patent: Jan. 2, 2024

(54) MAC-CE ACTIVATION TIME IN MULTI-PATH SIDELINK RELAY

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/393,285

(22) Filed: Aug. 3, 2021

(65) Prior Publication Data

US 2022/0046753 A1 Feb. 10, 2022

Related U.S. Application Data

(60) Provisional application No. 63/062,317, filed on Aug. 6, 2020.

(51) Int. Cl.
*H04W 88/04* (2009.01)
*H04W 80/02* (2009.01)
*H04W 24/08* (2009.01)
*H04W 92/18* (2009.01)

(52) U.S. Cl.
CPC ........... *H04W 80/02* (2013.01); *H04W 24/08* (2013.01); *H04W 88/04* (2013.01); *H04W 92/18* (2013.01)

(58) Field of Classification Search
CPC ..... H04W 80/02; H04W 24/08; H04W 88/04; H04W 92/18
See application file for complete search history.

(56) References Cited

U.S. PATENT DOCUMENTS

| | | | |
|---|---|---|---|
| 2020/0267663 A1* | 8/2020 | Xu | ...................... H04W 52/146 |
| 2021/0250139 A1 | 8/2021 | Zhang et al. | |
| 2022/0109478 A1* | 4/2022 | Wei | ...................... H04B 7/0695 |
| 2022/0322433 A1* | 10/2022 | Zhang | ..................... H04L 5/001 |
| 2022/0338127 A1* | 10/2022 | Gao | ...................... H04W 52/42 |

* cited by examiner

*Primary Examiner* — Lakeram Jangbahadur
(74) *Attorney, Agent, or Firm* — Procopio, Cory, Hargreaves & Savitch

(57) ABSTRACT

A configuration for an originating wireless device to transmit one or more MAC-CEs, where each of the one or more MAC-CEs include information related to the number of MAC-CEs transmitted. The apparatus transmits at least one of a plurality of related MAC-CEs to a second wireless device based on a determination of at least a first path of a plurality of paths to transmit the at least one of the plurality of related MAC-CEs. The at least one of the plurality of related MAC-CEs indicates a number of the plurality of related MAC-CEs transmitted by the first wireless device. The apparatus monitors for a response MAC-CE from the second wireless device based on a transmission of the at least one of the plurality of related MAC-CEs. The response MAC-CE corresponds to an activation of the MAC-CE transmitted to the second wireless device.

30 Claims, 11 Drawing Sheets

MAC-CE ACTIVATION TIME IN MULTI-PATH SIDELINK RELAY

CROSS REFERENCE TO RELATED APPLICATION(S)

This application claims the benefit of and priority to U.S. Provisional Application Ser. No. 63/062,317, entitled "MAC-CE Activation Time in Multi-Path Sideline Relay" and filed on Aug. 6, 2020, which is expressly incorporated by reference herein in its entirety.

TECHNICAL FIELD

The present disclosure relates generally to communication systems, and more particularly, to a configuration for activating a media access control (MAC) control element (CE) (MAC-CE) transmitted over multipath sidelink relays.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus transmits at least one of a plurality of related medium access control-control elements (MAC-CEs) to a second wireless device based on a determination of at least a first path of a plurality of paths to transmit the at least one of the plurality of related MAC-CEs. The at least one of the plurality of related MAC-CEs indicates a number of the plurality of related MAC-CEs transmitted by the first wireless device. The apparatus monitors for a response MAC-CE from the second wireless device based on a transmission of the at least one of the plurality of related MAC-CEs. The response MAC-CE corresponds to an activation of the MAC-CE transmitted to the second wireless device.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives at least one of a plurality of related medium access control-control elements (MAC-CEs) from a first wireless device. The at least one of the plurality of related MAC-CEs indicates a number of the plurality of related MAC-CEs that are transmitted. The apparatus transmits a response MAC-CE to the first wireless device based on a reception of the at least one of the plurality of related MAC-CEs. The response MAC-CE corresponds to an activation of the at least one of the plurality of related MAC-CEs received by the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
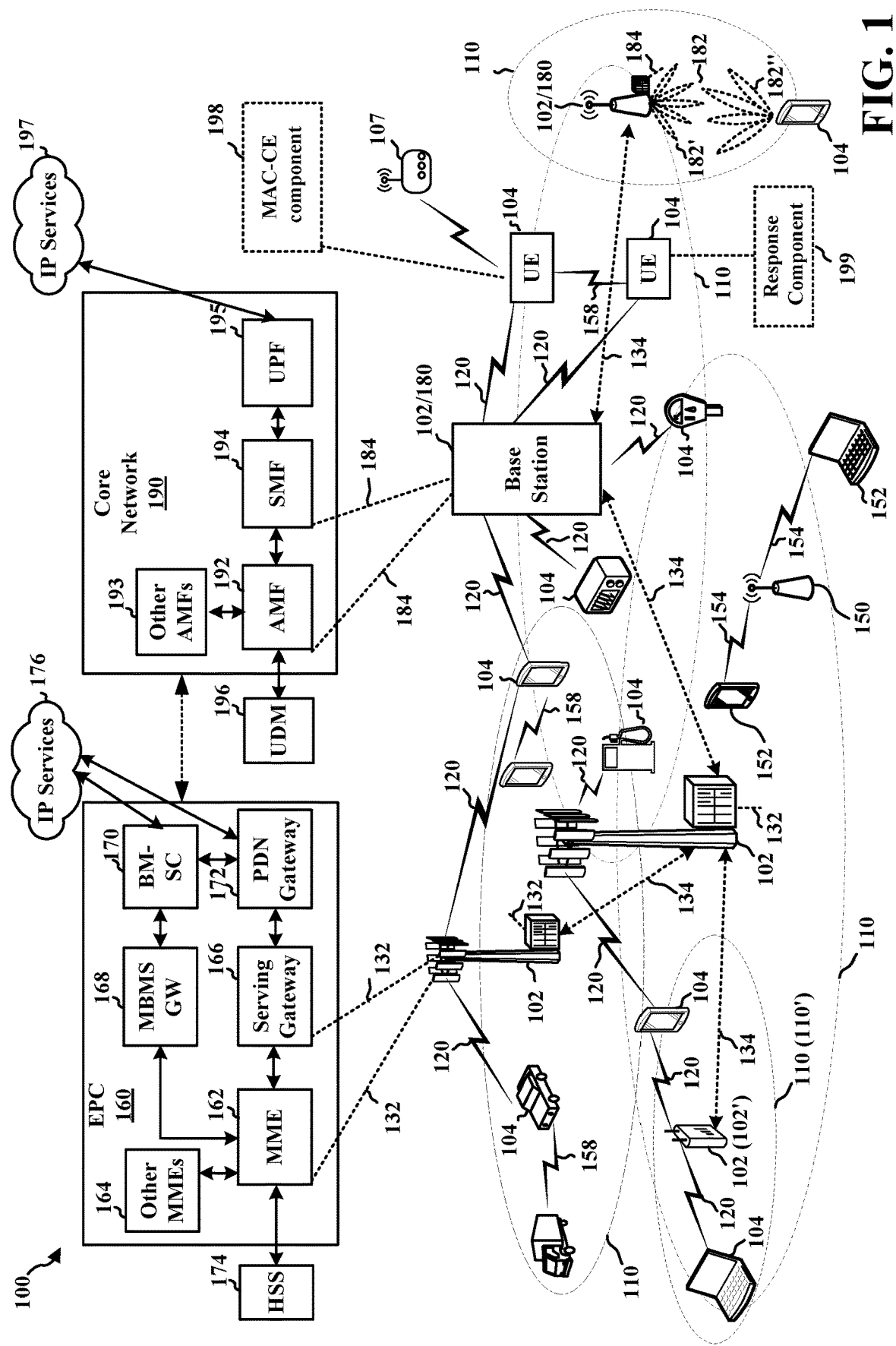
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as abase station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may be configured to transmit one or more MAC-CEs, where each of the one or more MAC-CEs include information related to the number of MAC-CEs transmitted. For example, the UE 104 or other device may comprise a MAC-CE component 198 configured to transmit at least one of a plurality of related MAC-CEs to a second wireless device, where the at least one of the plurality of related MAC-CEs indicates a number of the plurality of related MAC-CEs transmitted by the first wireless device. The UE 104 may determine at least one path of a plurality of paths to transmit at least one of a plurality of related MAC-CEs. The UE 104 may transmit the at least one of the plurality of related MAC-CEs to a second wireless device based on a first path of the plurality of paths. The at least one of the plurality of related MAC-CEs indicates a number of the plurality of related MAC-CEs transmitted by the first wireless device. The UE 104 may monitor for a response MAC-CE from the second wireless device based on a transmission of the at least one of the plurality of related MAC-CEs. The response MAC-CE corresponds to an activation of the MAC-CE transmitted to the second wireless device.

Referring again to FIG. 1, in certain aspects, a UE 104, or other device communication based on sidelink, may be configured to transmit a response MAC-CE, where the response MAC-CE may correspond to an activation of at least one of a plurality of related MAC-CEs received by the UE 104. For example, the UE 104 or other device may comprise a response component 199 configured to transmit a response MAC-CE that corresponds to an activation of at least one of the plurality of related MAC-CEs received by the UE 104. The UE 104 may receive at least one of a plurality of related MAC-CEs from a first wireless device. The at least one of the plurality of related MAC-CEs indicates a number of the plurality of related MAC-CEs that are transmitted. The UE 104 may transmit a response MAC-CE to the first wireless device based on a reception of the at least one of the plurality of related MAC-CEs. The response MAC-CE corresponds to an activation of the at least one of the plurality of related MAC-CEs received by the second wireless device.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a MAC-CE component 198 configured to activate a MAC-CE transmitted over a sidelink relay after waiting a time period.

Although the following description may be focused on 5G NR, the concepts described herein may be applicable to other similar areas, such as LTE, LTE-A, CDMA, GSM, and other wireless technologies.

Figure 2:
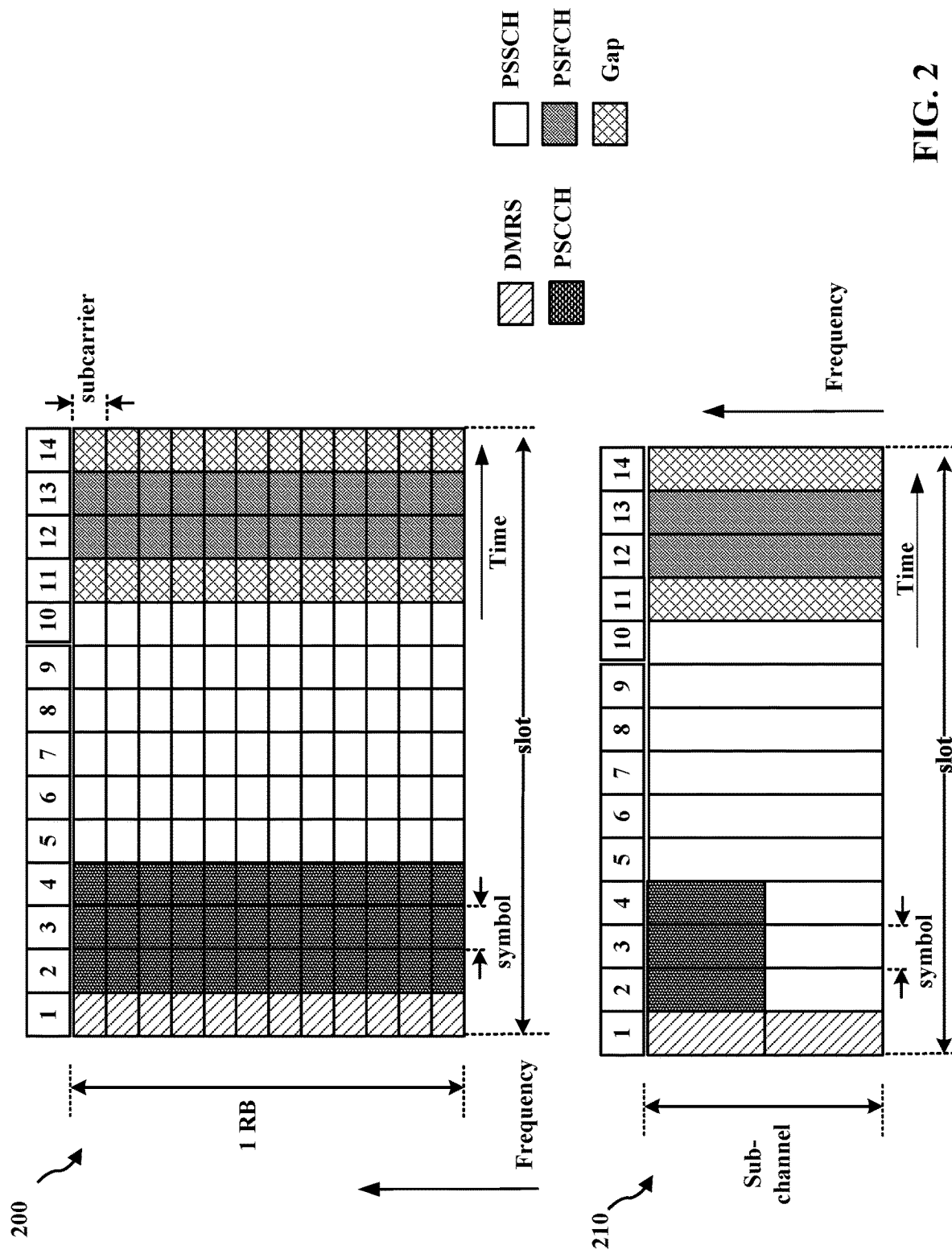
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
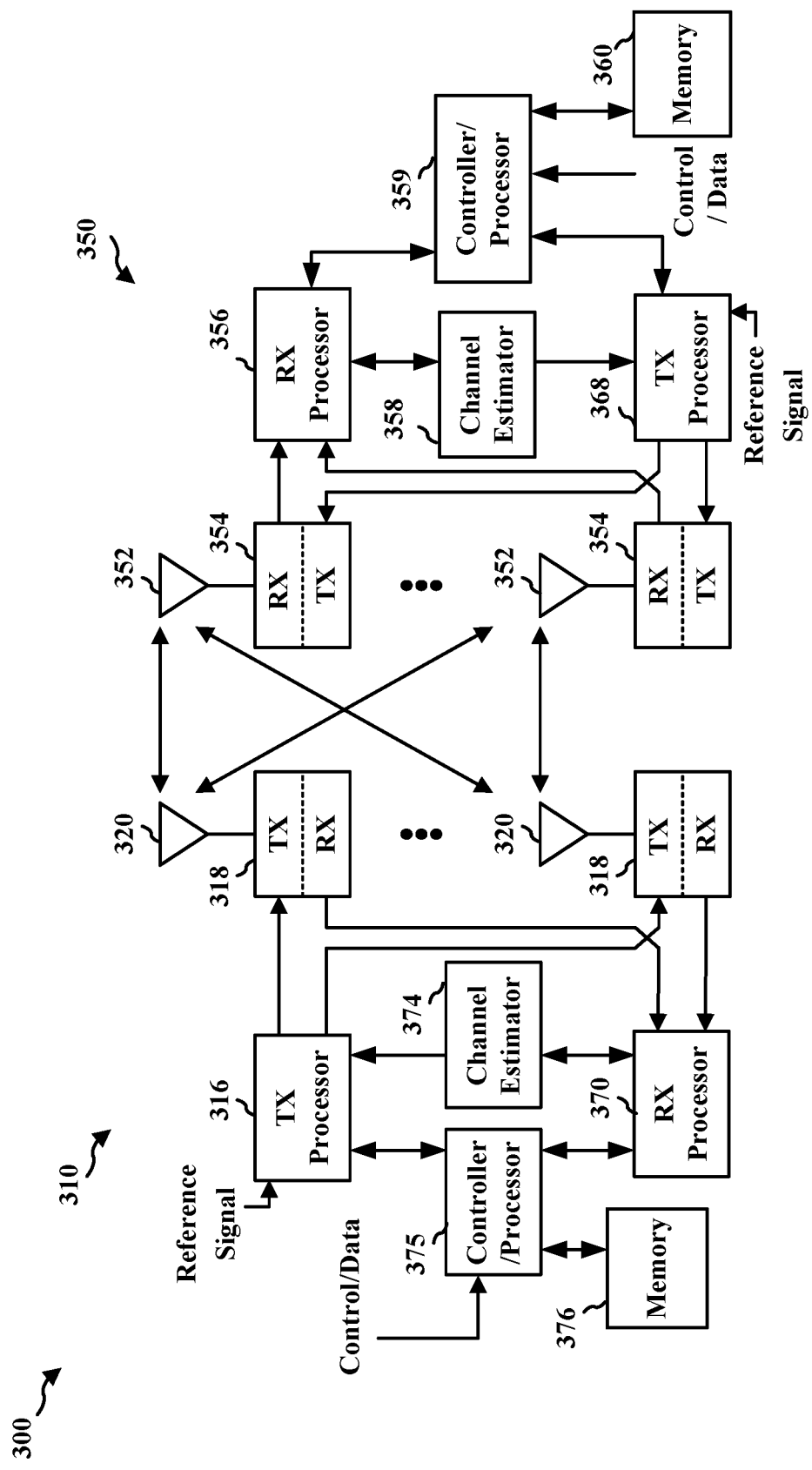
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device

350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Figure 4:
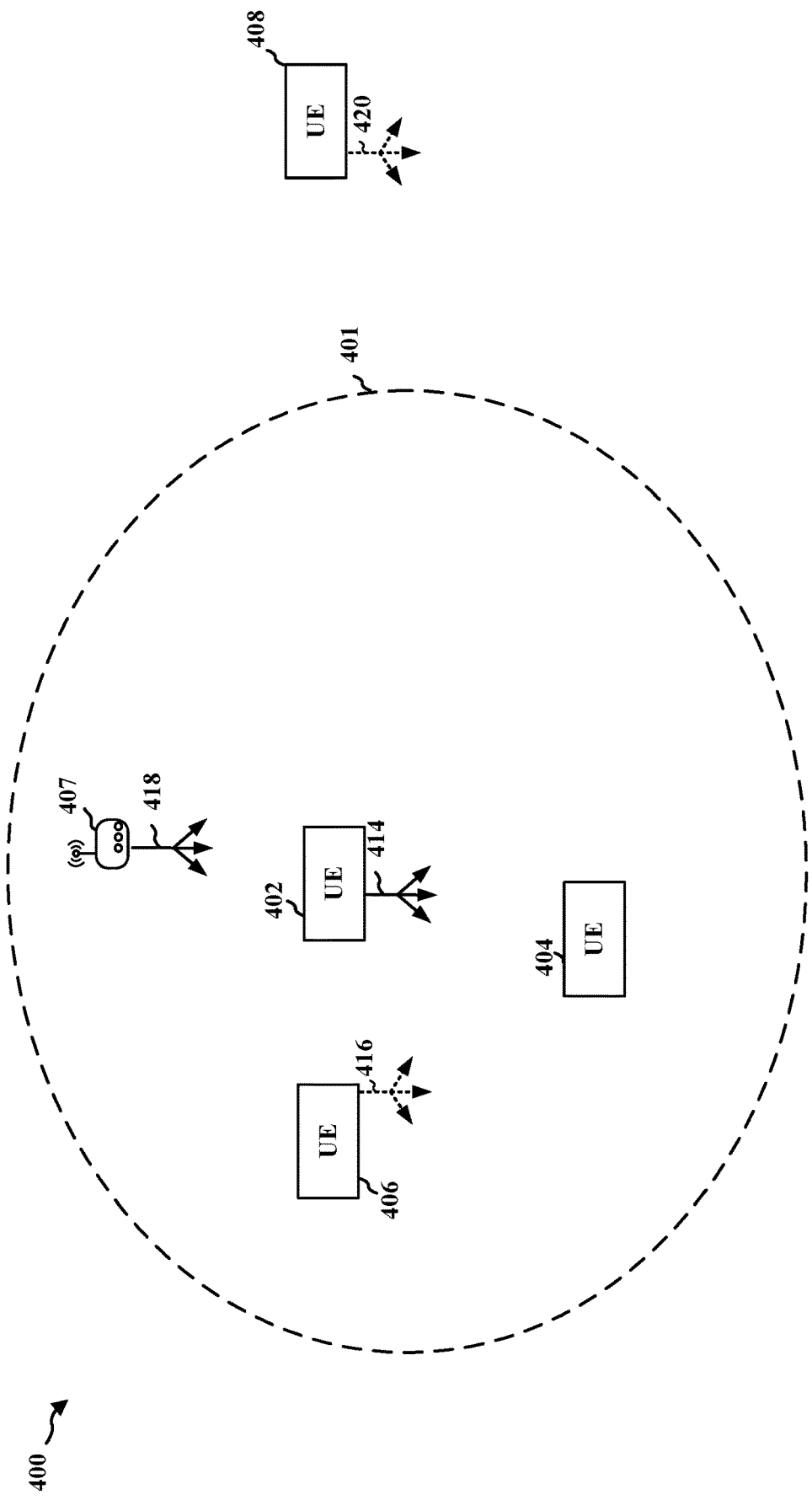
FIG. 4 illustrates an example of a wireless communication.

FIG. 4 illustrates an example 400 of wireless communication between devices based on sidelink communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting a transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication 418 to UEs 402, 404, 406, 408.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

A MAC-CE is a command from one wireless device to another wireless device. In some examples, the wireless device may be a UE or a base station. Accordingly, the UE or the base station may send command messages in a MAC-CE to another UE. MAC-CEs between UEs may be transmitted through a sidelink communication. In some examples, the device transmitting the MAC-CE may rely on feedback through HARQ messaging from the receiving UE in order to improve reliability. HARQ feedback may also increase latency. For example, the receiver may provide a HARQ ACK to the transmitter to provide confirmation that a command has been successfully received through the MAC-CE. In some examples, the transmitting device may wait to receive the HARQ feedback before sending an additional command.

Alternatively, the command messages may be transmitted via DCI on DL or UCI (over PUCCH or PUSCH) on UL. Transmitting the command messages via DCI on DL or UCI on UL does not include HARQ messaging (e.g., ACK/ negative ACK (NACK)). Therefore, the command messages transmitted via DCI on DL or UCI on UL may have lower latency, but may be less reliable.

The MAC-CE may be transmitted over sidelink. In LTE communication, for example, a sidelink (SL) buffer status report (BSR) MAC-CE (SL-BSR MAC-CE) may be transmitted on a Uu link to indicate buffer-status of the sidelink traffic. For NR vehicle-to-everything (V2X) (NRV2X), a CSI report may be transmitted over a sidelink MAC-CE. By transmitting the sidelink MAC-CE including the CSI report, UE may not perform UCI-multiplexing.

To implement more advanced use cases, more sidelink-related MAC-CEs may be needed. For example, the MAC-CEs transmitted over either the Uu link or the sidelink communication may carry sidelink-related information. In the case of sidelink relaying, the MAC-CEs may indicate the relayed traffic and/or the originating traffic. In the case of the Uu-PC5 slot-aggregation, special handling may be provided for the MAC-CE, and the MAC-CE may indicate which code block groups (CBGs) was transmitted through which link.

The Uu link MAC-CEs (DL or UL) relayed via the sidelink communication may include appended relaying/routing information. The relaying/routing information may be separately indicated for RRC/MAC-CE/DCI or their sidelink equivalents. The relaying information may include one or more of source-node, destination node, or transit route.

In case the last leg of relay is the Uu link, the routing information may be removed, or some or all of it may be kept (e.g., keep source ID) at the last leg. In case of Uu+PC5 slot-aggregation, the last leg may be the Uu+PC5 link, and the routing information indication may be different compared to the Uu-only link.

The contents of the MAC-CE may include commands to a target network device (e.g., a receiving UE) to perform or activate a certain function. The MAC-CEs transmitted on the SL may include SL-related content such as SL-CSI, SL timing advance (SL-TA) (e.g., for out of coverage (OOC)), SL transmit power control (TPC) (SL-TPC), SL scheduling request (SR)/buffer status report (BSR)/power headroom report (PHR), activation/deactivation of SL semi-persistent scheduling (SL-SPS)/carrier grade (CG) and/or aperiodic/semi-persistent (A/SP) SL-CSI-RS/SRS (A/SP SL-CSI-RS/SRS). When the MAC-CEs including the above provided contents are relayed over SL, the routing information may be padded/removed as proffered regarding the SL-relayed Uu MAC-CE.

The MAC-CEs sent on Uu link with SL-related content (e.g., SL-BSR of LTE) may include the SL-PHR, the TPC, recommended bit-rate, channel busy ratio (CBR)/channel occupation ratio (CR), and the gNB-relayed MAC-CEs as proffered regarding the MAC-CEs transmitted on the SL with SL-related content.

A 'header' MAC-CE may indicate which CBGs are transmitted through which link (the Uu link or the PC5 link). The header MAC-CE may also indicate locations of other MAC-CEs, particularly, whether they come from the Uu link or the PC5 link.

The MAC-CE may have an activation time. On the Uu link, some of the MAC-CEs such as the UL MAC-CEs, DL TA & recommended bit rate may not have the activation time, but many MAC-CEs may have the activation time based on the time of the ACK transmission. For example, an activation time may be 3 ms or N slots after the transmission of ACK. The counting of time either includes or excludes TA commands received during the counting. The ACK Tx refers to ACK for the whole TB. In general, UL MAC-CEs don't have activation time, because how to react to the UL MAC-CE is up to the gNB implementation.

On the SL communication, the MAC-CEs sent to the gNB with the SL-related content may be treated like the Uu UL MAC-CEs, and it is up to the gNB implementation to determine how to react to the MAC-CEs. The MAC-CEs sent to a UE over SL or over DL (with SL-related content) may be treated like Uu DL MAC-CEs. Accordingly, the activation time may be based on ACK. The activation time may be different for the MAC-CEs sent over the SL and the MAC-CE sent over the DL. Furthermore, a MAC-CEs relayed to the UE through relaying UE may need special consideration.

The MAC-CEs may be relayed to a receiving UE through the relaying UE, and different activation time may be configured for the receiving UE. The ACK may be transmitted in response to successfully receiving the MAC-CE. In case the ACK is not relayed, the ACK may be directly transmitted from the receiving UE to the originating UE, the UE from which the MAC-CE originated. The receiving UE may follow ACK timing, and may have the activation time based on the time of the ACK transmission. For example, the receiving UE may wait 3 ms after transmitting the ACK to the originating UE before activating the MAC-CE.

In case the ACK is relayed back to the originating UE through the relaying UE, the receiving UE may follow a timing dependent on the time delay caused by the hopping of the relayed MAC-CE, since a predetermined time delay may not be sufficient compared to the directly transmitted ACK. For example, the receiving UE may use an X ms for activation time, where the X ms depends on number of hops. Since the number of hops may be dynamic and the receiving UE may not know the number of signal hops, this information may be separately indicated to the receiving UE (e.g., as a part of the ACK or in DCI/MAC-CE/RRC). For example, the receiving UE may use an 'expected' number of hops instead as preconfigured.

In another example, the receiving UE may follow the timing of the last hop of ACK. The receiving UE may know the timing based on when it receives the ACK. However, the originating UE may not know this time. Again, the receiving UE may use a preconfigured/expected timing which is based on the number of the hops, and the preconfigured/expected timing may become equivalent to the option of configuring the X ms of activation time. When the ACK may be relayed by multiple routes, the number of hops to determine the 'X ms' may be based on the shortest route or the longest route, where the length of the route refers to the number of hops.

Figure 5:
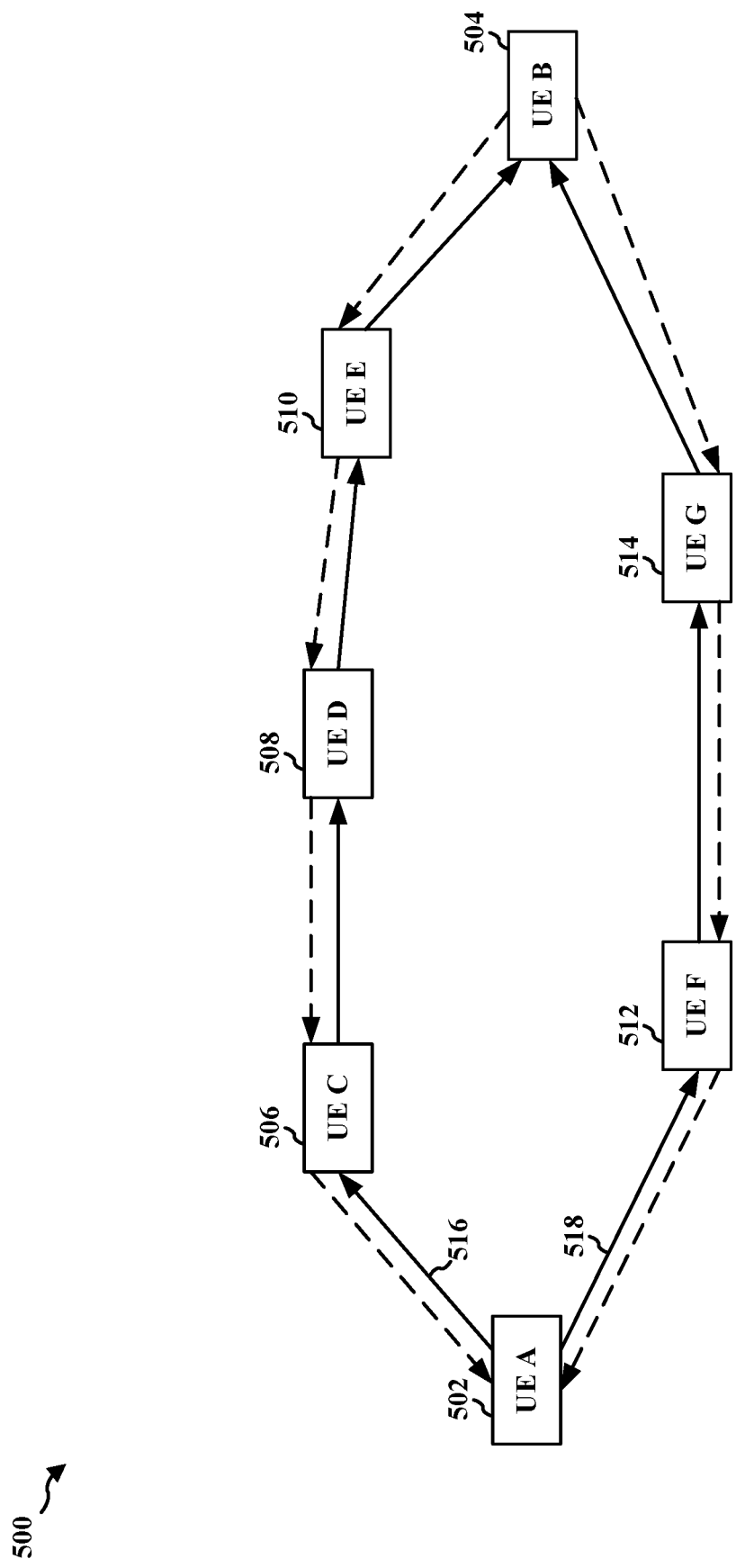
FIG. 5 illustrates an example of a wireless communication.

When an originating UE transmits a MAC-CE including a command to a receiving UE via a relay UE, the receiving UE may determine an activation time to activate the command received in the MAC-CE from the originating UE via the relay UE. The originating UE may send the MAC-CE to the receiving UE on one or multiple paths between the originating UE and the receiving UE. For example, with reference to the diagram 500 of FIG. 5, the originating UE (e.g., UE A 502) may transmit the MAC-CE to the receiving UE (e.g., UE B 504) via a first path 516 comprising UE C 506, UE D 508, and UE E 510. In another example, again with reference to the diagram 500 of FIG. 5, the originating UE (e.g., UE A 502) may transmit the MAC-CE to the receiving UE (e.g., UE B 504) via a second path 518 comprising UE F 512 and UE G 514. The receiving UE may send a response MAC-CE back to the transmitting UE, which may be in the form of or in addition to a HARQ ACK. The response MAC-CE may comprise an ACK/NACK, or may comprise data. The data may include a time when the receiving UE received the MAC-CE such that the originating UE may measure a round trip time (RTT), or the number of MAC-CEs the receiving UE received from the originating UE. However, in some instances, the originating UE may transmit multiple MAC-CEs to the receiving UE.

Aspects provided herein provide a configuration that allows for a receiving UE to account for the reception of multiple MAC-CEs transmitted from the originating UE. In some aspects, the originating UE may transmit multiple MAC-CEs to the receiving UE. Each of the multiple MAC-CEs may indicate transmission information related to the MAC-CE, such that the receiving UE may transmit a corresponding response MAC-CE.

The originating UE may transmit multiple MAC-CEs to the receiving UE. Each of the multiple MAC-CEs may indicate whether multiple MAC-CEs were transmitted by the originating UE. In some aspects, each of the multiple MAC-CEs may indicate the number of the multiple MAC-CEs transmitted by the originating UE. Each MAC-CE may also comprise an index of each MAC-CE transmitted, as well as information with regards to when other MAC-CEs are going to be transmitted or which path will be utilized to transmit the MAC-CEs.

The MAC-CE transmitted by the originating UE may include instructions for the receiving UE for transmitting the response MAC-CE. For example, that MAC-CE may include instructions for the receiving UE to transmit the response MAC-CE in response to a particular received MAC-CE (e.g., first received MAC-CE, second received MAC-CE, or last received MAC-CE) or to transmit a response MAC-CE to each received MAC-CE. In some aspects, the MAC-CE may instruct the receiving UE to transmit the response MAC-CE upon receipt of a particular MAC-CE of the multiple MAC-CEs.

Each response MAC-CE may correspond to an activation of the MAC-CE received from the originating UE. For example, if a response MAC-CE is transmitted for each of the multiple MAC-CE and N MAC-CEs were received by the receiving UE, then the MAC-CE would be activated N times. In another example, the MAC-CE may indicate that only the first MAC-CE is to be activated by the receiving UE, such that a response MAC-CE may be transmitted for every MAC-CE received. The time at which the MAC-CE is activated may be based on the reception time of the MAC-CE and the transmission of the response MAC-CE. In some aspects, the MAC-CE may instruct the receiving UE to activate a particular MAC-CE received (e.g., a second MAC-CE) at the same time as when another MAC-CE is activated (e.g., a first MAC-CE). The activation of the one or more MAC-CE received by the receiving UE may be activated at the same time or at different times.

The response MAC-CE may be configured to identify the corresponding MAC-CE to which the response MAC-CE is responding. For example, the MAC-CE transmitted by the originating UE may comprise an identifier (ID) identifying the respective MAC-CE from the multiple MAC-CEs transmitted by the originating UE. The response MAC-CE that is to be transmitted in response to a MAC-CE ID I, may include the ID I, to indicate that the response MAC-CE corresponds to the MAC-CE I. In some aspects, the receiving UE may transmit a plurality of response MAC-CEs that may correspond to respective MAC-CEs or to at least one MAC-CE.

Figure 6:
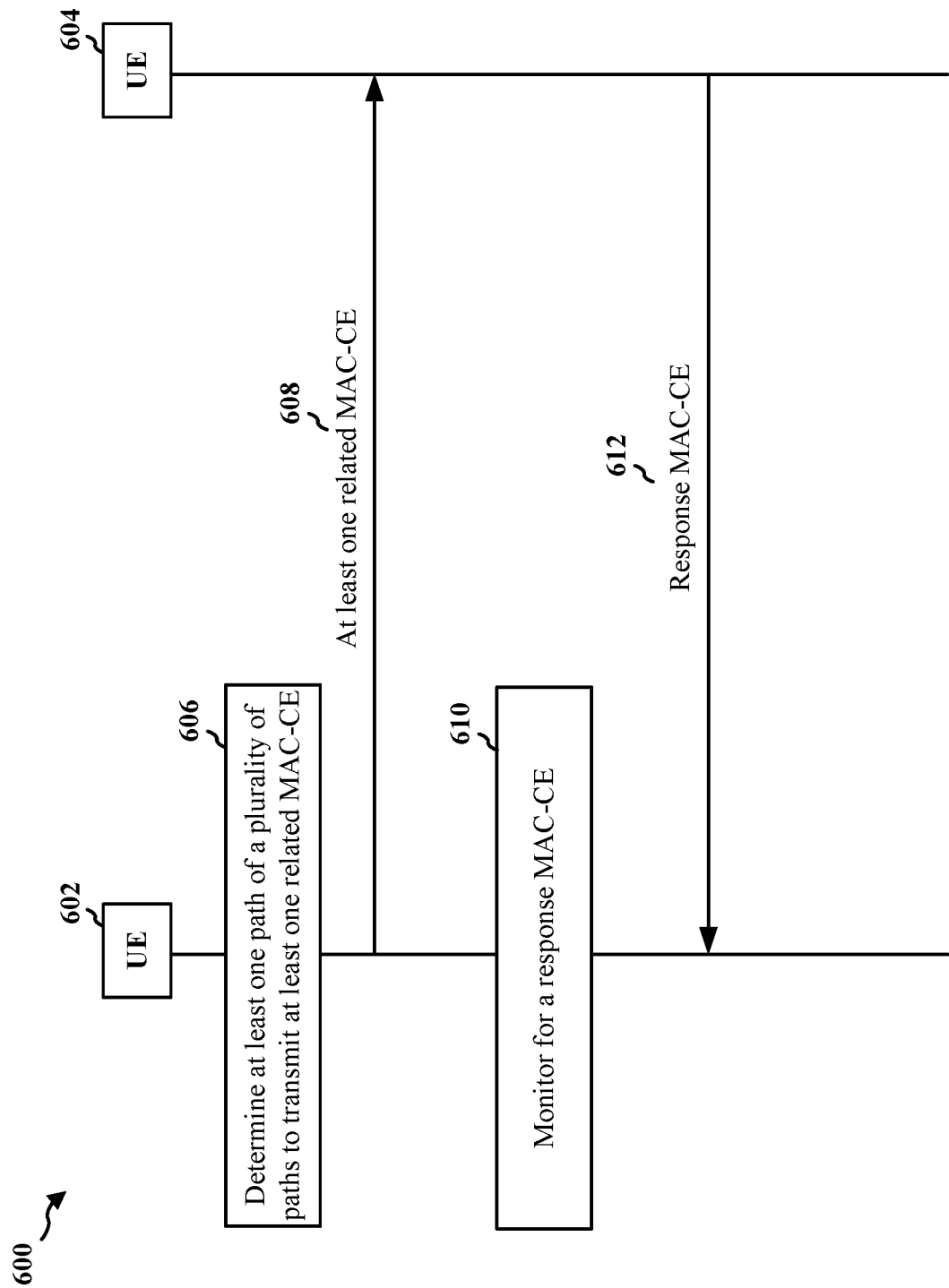
FIG. 6 illustrates an example communication flow between a first UE and a second UE.

FIG. 6 is a call flow diagram 600 of signaling between a first wireless device (e.g., UE 502) and a second wireless device (e.g., UE 504). The first UE 502 may be configured to communicate with the second UE 504. The UEs 502, 504 may correspond to at least UE 104 of FIG. 1. In the context of FIG. 3, the UE 502 may correspond to the wireless device 310 and the UE 504 may correspond to the wireless device 350. Optional aspects are illustrated with a dashed line.

As illustrated at 606, the first UE 602 may determine at least one path of a plurality of paths. The first UE 602 may determine the at least one path of the plurality of paths to transmit at least one of a plurality of related MAC-CEs.

As illustrated at 608, the first UE 602 may transmit the at least one of the plurality of related MAC-CEs. The first UE 602 may transmit the at least one of the plurality of related MAC-CEs to a second wireless device (e.g., second UE 604). The second UE 604 may receive the at least one of the plurality of related MAC-CEs. The first UE 602 may transmit the at least one of the plurality of related MAC-CEs to the second UE 604 based on a determination of at least a first path of the plurality of paths to transmit the at least one of the plurality of related MAC-CEs. The at least one of the plurality of related MAC-CEs may indicate a number of the plurality of related MAC-CEs transmitted by the first UE 602 (e.g., first wireless device). In some aspects, the at least one of the plurality of related MAC-CEs may indicate that a single related MAC-CEs is transmitted. In some aspects, the at least one of the plurality of related MAC-CEs may indicate that multiple related MAC-CEs are transmitted. Each of the plurality of related MAC-CEs may provide an index for a respective one of the plurality of related MAC-CEs. The at least one of the plurality of related MAC-CEs may indicate timing information about transmission of the plurality of related MAC-CEs. The at least one of the plurality of related MAC-CEs may indicate path information for each of the plurality of related MAC-CEs. In some aspects, the at least one of the plurality of related MAC-CEs may indicate for the second UE 604 or second wireless device to send a response MAC-CE in response to receiving a particular one of the plurality of related MAC-CEs. In some aspects, the at least one of the plurality of related MAC-CEs may indicate for the second UE 604 or second wireless device to send the response MAC-CE in response to receiving each of the plurality of related MAC-CEs. In some aspects, the second UE 604 may include in the response MAC-CE the time information of the corresponding MAC-CE received from the first UE 602. In some aspects, if the plurality of related MAC-CEs are transmitted, a corresponding response MAC-CE for each of the plurality of related MAC-CEs may correspond to the activation of each of the plurality of related MAC-CEs. In some aspects, the activation of each of the plurality of related MAC-CEs may occur at a same time. In some aspects, the activation of each of the plurality of related MAC-CEs may occur at a different time. In some aspects, at least one of the plurality of related MAC-CEs may be transmitted on a second path of the plurality of paths.

As illustrated at 610, the first UE 602 may monitor for a response MAC-CE from the second UE 604. The first UE 602 may monitor for the response MAC-CE from the second UE 604 based on a transmission of the at least one of the plurality of related MAC-CEs. The response MAC-CE may correspond to an activation of the MAC-CE transmitted to the second UE 604. The response MAC-CE may contain the timing information of the corresponding MAC-CE, and the first UE 602 may compute the round trip time of the MAC-CE between the first UE 602 and the second UE 604.

As illustrated at 612, the second UE 604 may transmit a response MAC-CE to the first UE 602. The first UE 602 may receive the response MAC-CE from the second UE 604. The second UE 604 may transmit the response MAC-CE to the first UE 602 based on a reception of the at least one of the plurality of related MAC-CEs. The response MAC-CE may correspond to an activation of the at least one of the plurality of related MAC-CEs received by the second UE 604. In some aspects, the second UE 604 may transmit a plurality of response MAC-CE. In some aspects, if the plurality of related MAC-CEs are transmitted, a corresponding response MAC-CE for each of the plurality of related MAC-CEs may correspond to the activation of each of the plurality of related MAC-CEs. In some aspects, the activation of each of the plurality of related MAC-CEs may occur at a same time. In some aspects, the activation of each of the plurality of related MAC-CEs may occur at a different time. In some aspects, the first UE 602 may receive a plurality of response MAC-CE from the second UE 604. In some aspects, the response MAC-CE may identify the particular one of the plurality of related MAC-CEs that triggered the response MAC-CE.

Figure 7:
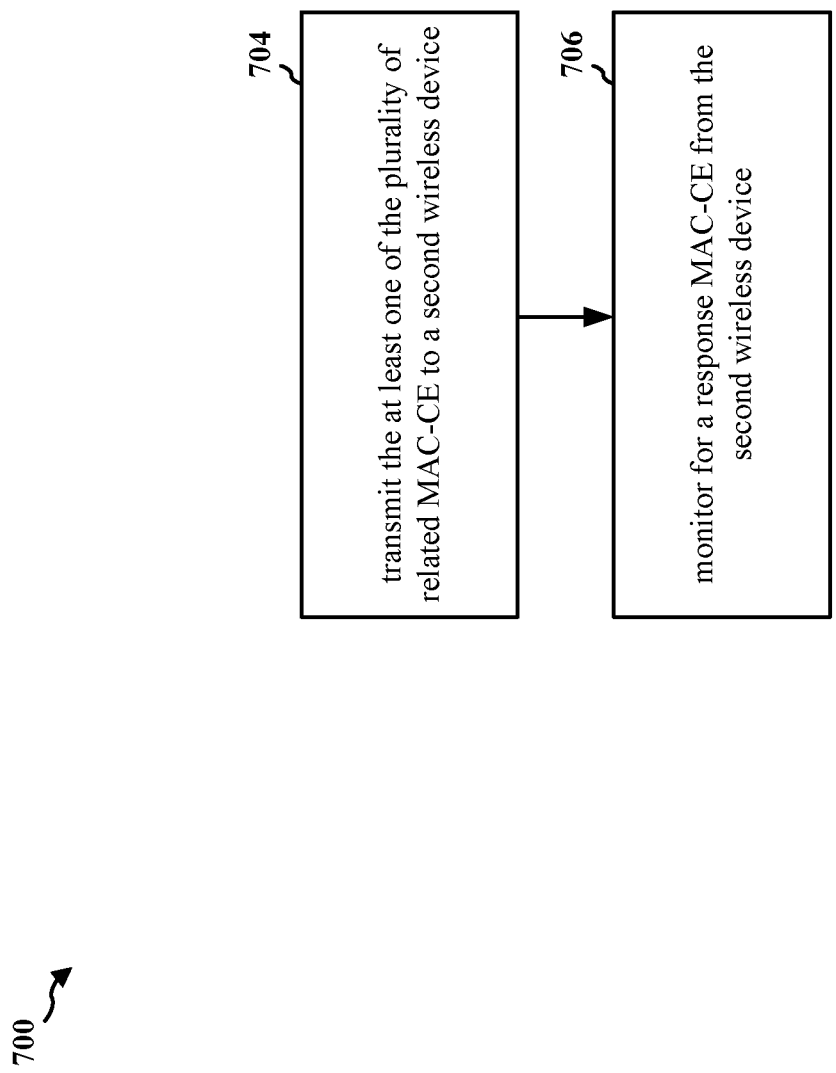
FIG. 7 is a flowchart of a method of wireless communication.

FIG. 7 is a flowchart 700 of a method of wireless communication. The method may be performed by a UE or a component of a UE (e.g., the UE 104, 402, 404, 406, 408, 502, 504, 506, 508, 510, 512, 514, 602, 604; the apparatus 902; the baseband processor 904, which may include the memory 360 and which may be the entire device 350 or a component of the device 350, such as the TX processor 368, the RX processor 356, and/or the controller/processor 359). One or more of the illustrated operations may be omitted, transposed, or contemporaneous. The method may configure a first or originating UE to transmit one or more MAC-CEs, where each of the one or more MAC-CEs include information related to the number of MAC-CEs transmitted.

In some aspects, the UE may determine at least one path of a plurality of paths. For example, the determination may be performed by path component 940 of apparatus 902. The UE may determine the at least one path of the plurality of paths to transmit at least one of a plurality of related MAC-CEs.

At 704, the UE may transmit the at least one of the plurality of related MAC-CEs. For example, 704 may be performed by MAC-CE component 942 of apparatus 902. The UE may transmit the at least one of the plurality of related MAC-CEs to a second wireless device (e.g., second UE). The UE may transmit the at least one of the plurality of related MAC-CEs to the second wireless device based on a determination of at least a first path of the plurality of paths to transmit the at least one of the plurality of related MAC-CEs. The at least one of the plurality of related MAC-CEs may indicate a number of the plurality of related MAC-CEs transmitted by the UE (e.g., first wireless device). In some aspects, the at least one of the plurality of related MAC-CEs may indicate that a single related MAC-CEs is transmitted. In some aspects, the at least one of the plurality of related MAC-CEs may indicate that multiple related MAC-CEs are transmitted. Each of the plurality of related MAC-CEs may provide an index for a respective one of the plurality of related MAC-CEs. The at least one of the plurality of related MAC-CEs may indicate timing information about transmission of the plurality of related MAC-CEs. The at least one of the plurality of related MAC-CEs may indicate path information for each of the plurality of related MAC-CEs. In some aspects, the at least one of the plurality of related MAC-CEs may indicate for the second UE or second wireless device to send a response MAC-CE in response to receiving a particular one of the plurality of related MAC-CEs. In some aspects, the at least one of the plurality of related MAC-CEs may indicate for the second UE or second wireless device to send the response MAC-CE in response to receiving each of the plurality of related MAC-CEs. In some aspects, if the plurality of related MAC-CEs are transmitted, a corresponding response MAC-CE for each of the plurality of related MAC-CEs may correspond to the activation of each of the plurality of related MAC-CEs. In some aspects, the activation of each of the plurality of related MAC-CEs may occur at a same time. In some aspects, the activation of each of the plurality of related MAC-CEs may occur at a different time. In some aspects, at least one of the plurality of related MAC-CEs may be transmitted on a second path of the plurality of paths.

At 706, the UE may monitor for a response MAC-CE from the second wireless device or second UE. For example, 706 may be performed by monitor component 944 of apparatus 902. The UE may monitor for the response MAC-CE from the second wireless device or second UE based on a transmission of the at least one of the plurality of related MAC-CEs. The response MAC-CE may correspond to an activation of the MAC-CE transmitted to the second UE or second wireless device.

Figure 8:
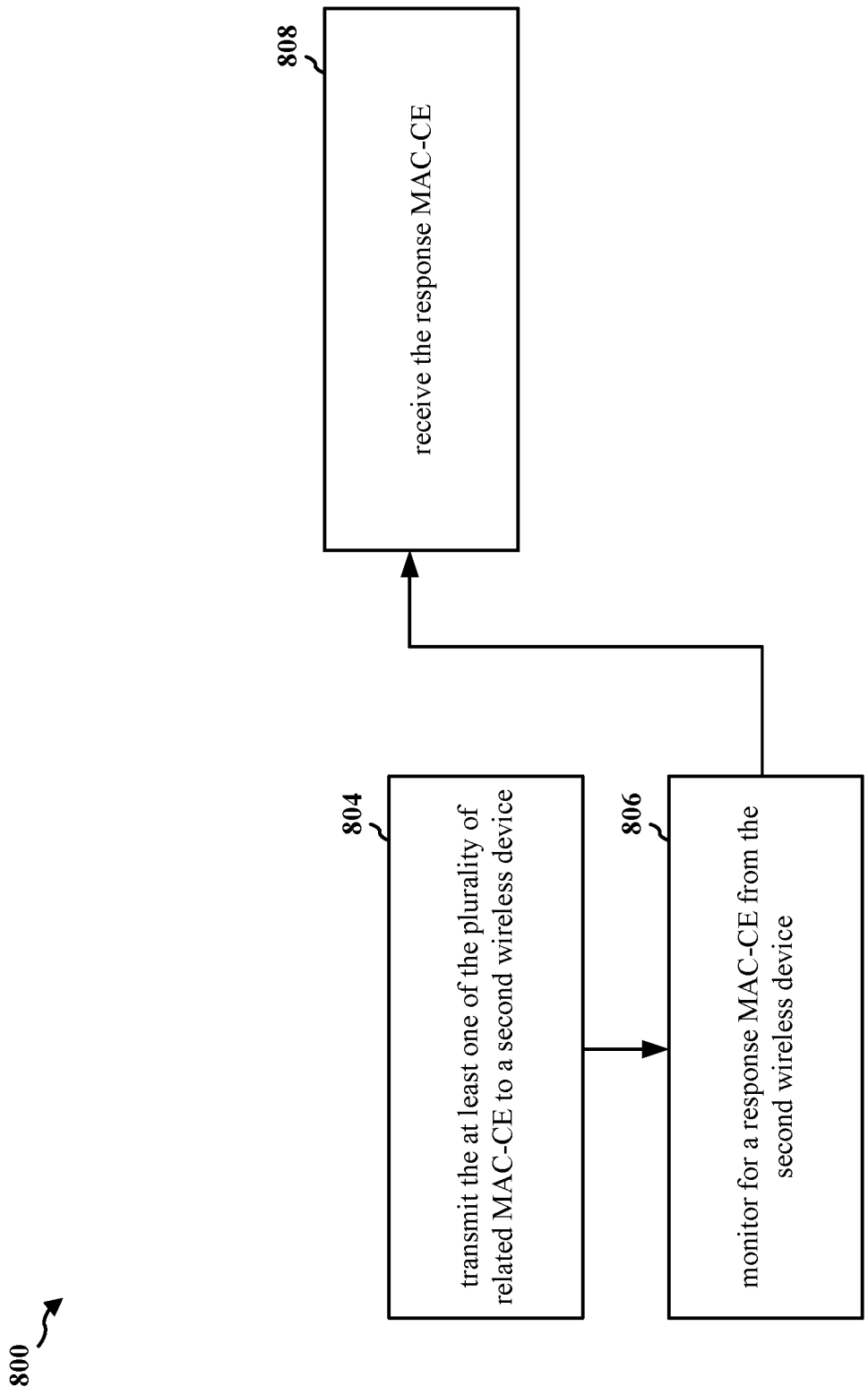
FIG. 8 is a flowchart of a method of wireless communication.

FIG. 8 is a flowchart 800 of a method of wireless communication. The method may be performed by a UE or a component of a UE (e.g., the UE 104, 402, 404, 406, 408, 502, 504, 506, 508, 510, 512, 514, 602, 604; the apparatus 902; the baseband processor 904, which may include the memory 360 and which may be the entire device 350 or a component of the device 350, such as the TX processor 368, the RX processor 356, and/or the controller/processor 359). One or more of the illustrated operations may be omitted, transposed, or contemporaneous. The method may configure a first or originating UE to transmit one or more MAC-CEs, where each of the one or more MAC-CEs include information related to the number of MAC-CEs transmitted.

In some aspects, the UE may determine at least one path of a plurality of paths. For example, the determination may be performed by path component 940 of apparatus 902. The UE may determine the at least one path of the plurality of paths to transmit at least one of a plurality of related MAC-CEs.

At 804, the UE may transmit the at least one of the plurality of related MAC-CEs. For example, 804 may be performed by MAC-CE component 942 of apparatus 902. The UE may transmit the at least one of the plurality of related MAC-CEs to a second wireless device (e.g., second UE). The UE may transmit the at least one of the plurality of related MAC-CEs to the second wireless device based on a determination of at least a first path of the plurality of paths to transmit the at least one of the plurality of related MAC-CEs. The at least one of the plurality of related MAC-CEs may indicate a number of the plurality of related MAC-CEs transmitted by the UE (e.g., first wireless device). In some aspects, the at least one of the plurality of related MAC-CEs may indicate that a single related MAC-CEs is transmitted. In some aspects, the at least one of the plurality of related MAC-CEs may indicate that multiple related MAC-CEs are transmitted. Each of the plurality of related MAC-CEs may provide an index for a respective one of the plurality of related MAC-CEs. The at least one of the plurality of related MAC-CEs may indicate timing information about transmission of the plurality of related MAC-CEs. The at least one of the plurality of related MAC-CEs may indicate path information for each of the plurality of related MAC-CEs. In some aspects, the at least one of the plurality of related MAC-CEs may indicate for the second UE or second wireless device to send a response MAC-CE in response to receiving a particular one of the plurality of related MAC-CEs. In some aspects, the at least one of the plurality of related MAC-CEs may indicate for the second UE or second wireless device to send the response MAC-CE in response to receiving each of the plurality of related MAC-CEs. In some aspects, if the plurality of related MAC-CEs are transmitted, a corresponding response MAC-CE for each of the plurality of related MAC-CEs may correspond to the activation of each of the plurality of related MAC-CEs. In some aspects, the activation of each of the plurality of related MAC-CEs may occur at a same time. In some aspects, the activation of each of the plurality of related MAC-CEs may occur at a different time. In some aspects, at least one of the plurality of related MAC-CEs may be transmitted on a second path of the plurality of paths.

At 806, the UE may monitor for a response MAC-CE from the second wireless device or second UE. For example, 806 may be performed by monitor component 944 of apparatus 902. The UE may monitor for the response MAC-CE from the second wireless device or second UE based on a transmission of the at least one of the plurality of related MAC-CEs. The response MAC-CE may correspond to an activation of the MAC-CE transmitted to the second UE or second wireless device.

At 808, the UE may receive the response MAC-CE. For example, 808 may be performed by response component 946 of apparatus 902. The response MAC-CE may indicate reception of the particular one of the plurality of related MAC-CEs. In some aspects, the first UE or first wireless device may receive a plurality of response MAC-CE from the second UE or second wireless device. In some aspects, the response MAC-CE may identify the particular one of the plurality of related MAC-CEs on which the response MAC-CE is based.

Figure 9:
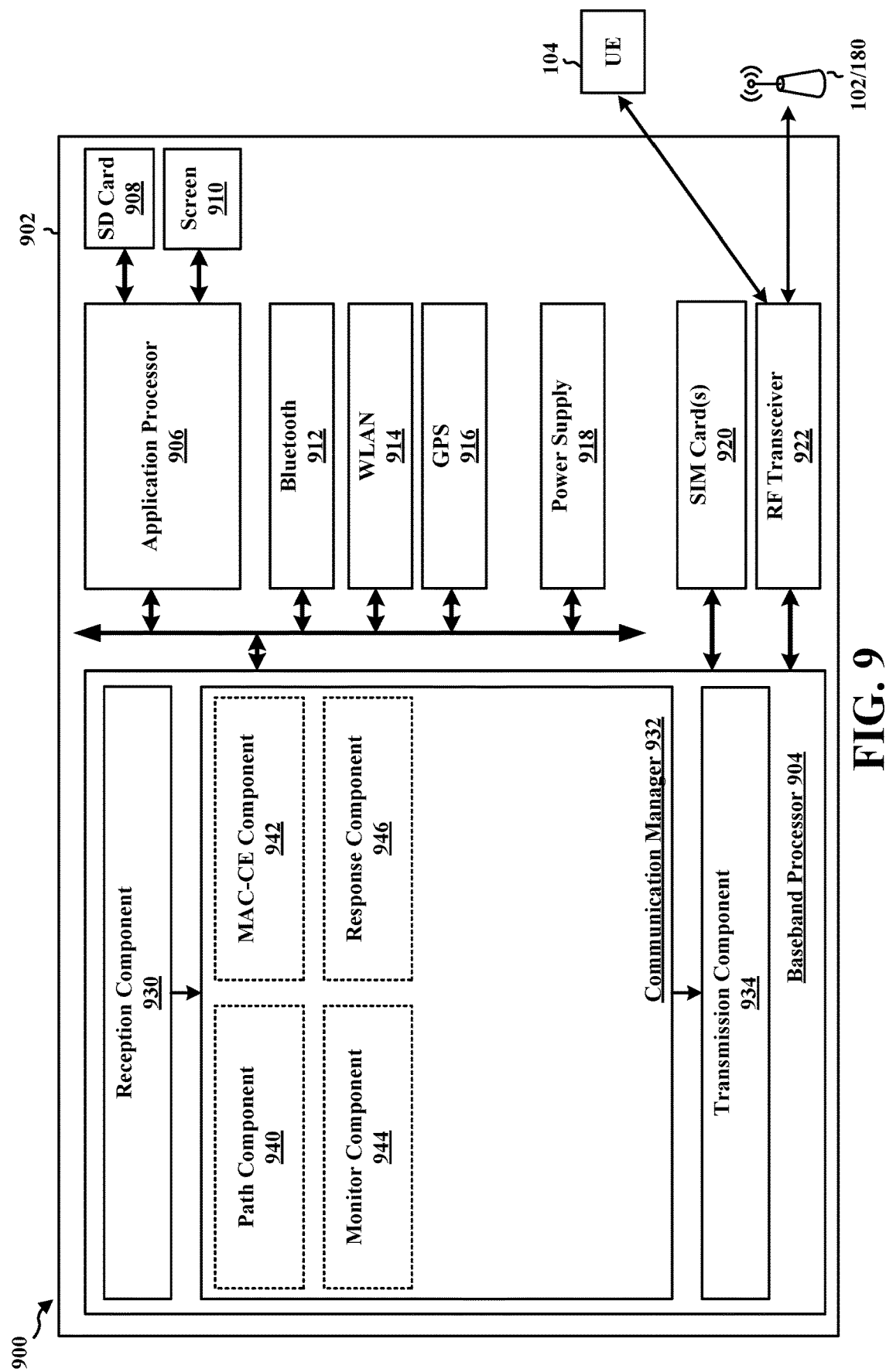
FIG. 9 is a diagram illustrating an example of a hardware implementation for an example apparatus.

FIG. 9 is a diagram 900 illustrating an example of a hardware implementation for an apparatus 902. The apparatus 902 may be a UE or another device that supports sidelink communication. The apparatus may include a baseband processor 904 (also referred to as a modem) coupled to a RF transceiver 922. The apparatus may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The baseband processor 904 communicates through the RF transceiver 922 with the UE 104 and/or BS 102/180. The baseband processor 904 may include a computer-readable medium/memory. The computer-readable medium/memory may be non-transitory. The baseband processor 904 is responsible for general processing, including the execution of software stored on the computer-readable medium/memory. The software, when executed by the baseband processor 904, causes the baseband processor 904 to perform the various functions described supra. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the device 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a path component 940 that is configured to determine at least one path of a plurality of paths. The communication manager 932 further includes a MAC-CE component 942 that is configured to transmit the at least one of the plurality of related MAC-CEs, e.g., as described in connection with 704 of FIG. 7 or 804 of FIG. 8. The communication manager 932 further includes a monitor component 944 that is configured to monitor for a response MAC-CE from the second wireless device or second UE, e.g., as described in connection with 706 of FIG. 7 or 806 of FIG. 8. The communication manager 932 further includes a response component 946 that is configured to receive the response MAC-CE, e.g., as described in connection with 808 of FIG. 8.

The apparatus may include additional components that perform each of the blocks of the algorithm in the flowcharts of FIG. 7 or 8. As such, each block in the flowcharts of FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband processor 904, includes means for determining at least one path of a plurality of paths to transmit at least one of a plurality of related MAC-CEs. The apparatus includes means for transmitting the at least one of the plurality of related MAC-CEs to a second wireless device based on a first path of the plurality of paths. The at least one of the plurality of related MAC-CEs indicates a number of the plurality of related MAC-CEs transmitted by the first wireless device. The apparatus includes means for monitoring for a response MAC-CE from the second wireless device based on a transmission of the at least one of the plurality of related MAC-CEs. The response MAC-CE corresponds to an activation of the MAC-CE transmitted to the second wireless device. The apparatus further includes means for receiving the response MAC-CE indicating reception of the particular one of the plurality of related MAC-CEs. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
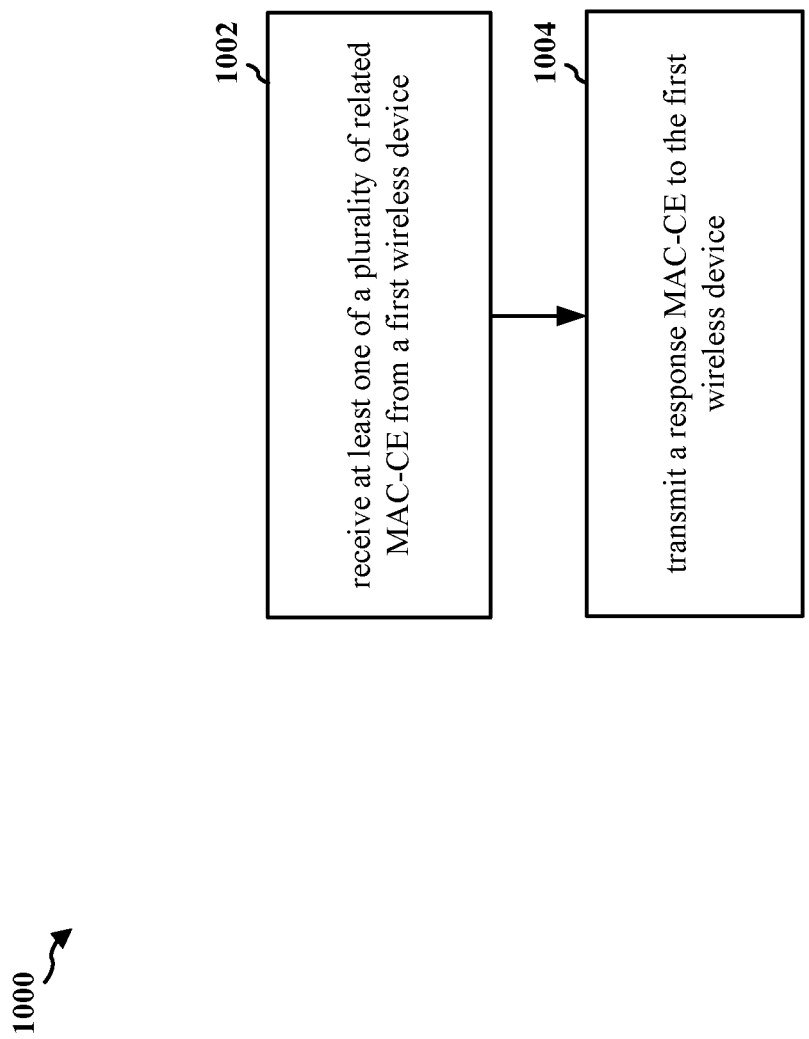
FIG. 10 is a flowchart of a method of wireless communication.

FIG. 10 is a flowchart 1000 of a method of wireless communication. The method may be performed by a UE or a component of a UE (e.g., the UE 104, 402, 404, 406, 408, 502, 504, 506, 508, 510, 512, 514, 602, 604; the apparatus 1102 the baseband processor 1104, which may include the memory 376 and which may be the entire device 310 or a component of the device 310, such as the TX processor 318, the RX processor 370, and/or the controller/processor 375). One or more of the illustrated operations may be omitted, transposed, or contemporaneous. The method may configure a second or receiving UE to transmit a response MAC-CE, where the response MAC-CE may correspond to an activation of at least one of a plurality of related MAC-CEs received by the second or receiving UE.

At 1002, the UE or second wireless device may receive at least one of a plurality of related MAC-CEs. For example, 1002 may be performed by MAC-CE component 1140 of apparatus 1102. The UE or second wireless device may receive at least one of a plurality of related MAC-CEs from a first wireless device. The at least one of the plurality of related MAC-CEs may indicate a number of the plurality of related MAC-CEs that are transmitted. In some aspects, at least one of the plurality of related MAC-CEs may indicate that a single related MAC-CE was transmitted. In some aspects, at least one of the plurality of related MAC-CEs may indicate that multiple related MAC-CEs are transmitted. The at least one of the plurality of related MAC-CEs may provide an index for a respective one of the plurality of related MAC-CEs. The at least one of the plurality of related MAC-CEs may indicate timing information for transmission of the plurality of related MAC-CEs. The at least one of the plurality of related MAC-CEs may indicate path information for each of the plurality of related MAC-CEs. In some aspects, at least one of the plurality of related MAC-CEs received from the first wireless device may indicate for the second wireless device to send the response MAC-CE in response to receiving a particular one of the plurality of related MAC-CEs. In some aspects, at least one of the plurality of related MAC-CEs received from the first wireless device may indicate for the second wireless device to send the response MAC-CE in response to receiving each of the plurality of related MAC-CEs. The second wireless device may send the response MAC-CE in response to receiving the particular one of the plurality of related MAC-CEs.

At 1004, the UE or second wireless device may transmit a response MAC-CE to the first wireless device. For example, 1004 may be performed by response component 1142 of apparatus 1102. The UE or second wireless device may transmit the response MAC-CE to the first wireless device based on a reception of the at least one of the plurality of related MAC-CEs. The response MAC-CE may correspond to an activation of the at least one of the plurality of related MAC-CEs received by the second wireless device. In some aspects, the second wireless device may transmit a plurality of response MAC-CE. In some aspects, if the plurality of related MAC-CEs are transmitted, a corresponding response MAC-CE for each of the plurality of related MAC-CEs may correspond to the activation of each of the plurality of related MAC-CEs. In some aspects, the activation of each of the plurality of related MAC-CEs may occur at a same time. In some aspects, the activation of each of the plurality of related MAC-CEs may occur at a different time. In some aspects, the response MAC-CE may identify the particular one of the plurality of related MAC-CEs that triggered the response MAC-CE.

Figure 11:
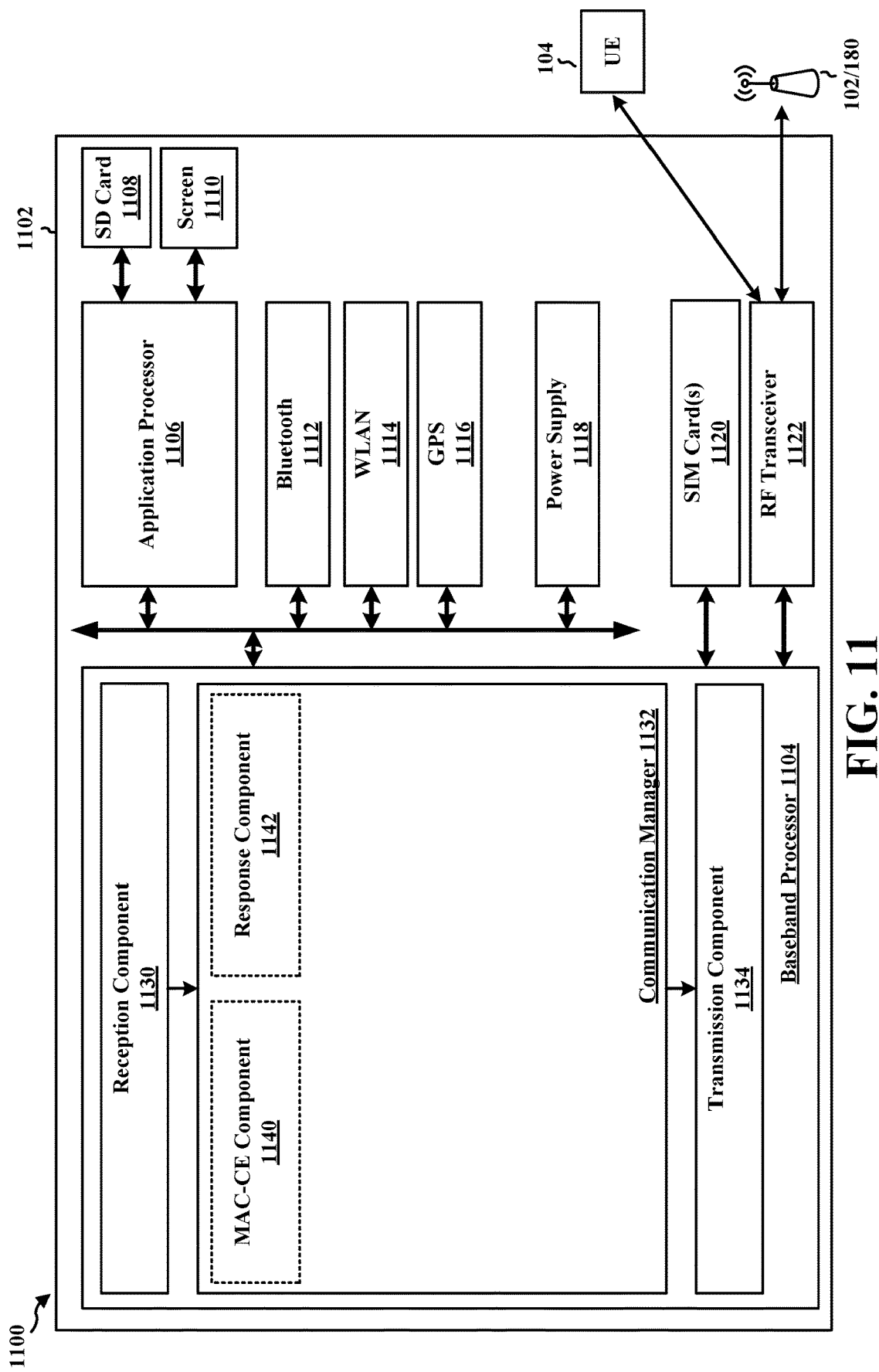
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE or other device that supports sidelink communication. The apparatus may include a baseband processor 1104 (also referred to as a modem) coupled to a RF transceiver 1122. The apparatus may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described supra. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a MAC-CE component 1140 that is configured to receive at least one of a plurality of related MAC-CEs, e.g., as described in connection with 1002 of FIG. 10. The communication manager 1132 further includes a response component 1142 that is configured to transmit a response MAC-CE to the first wireless device, e.g., as described in connection with 1004 of FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for receiving at least one of a plurality of related MAC-CEs from a first wireless device. The at least one of the plurality of related MAC-CEs indicates a number of the plurality of related MAC-CEs that are transmitted. The apparatus includes means for transmitting a response MAC-CE to the first wireless device based on a reception of the at least one of the plurality of related MAC-CEs. The response MAC-CE corresponds to an activation of the at least one of the plurality of related MAC-CEs received by the second wireless device. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to transmit at least one of a plurality of related MAC-CEs to a second wireless device based on a determination of at least a first path of a plurality of paths to transmit the at least one of the plurality of related MAC-CEs, wherein the at least one of the plurality of related MAC-CEs indicates a number of the plurality of related MAC-CEs transmitted by the first wireless device; and monitor for a response MAC-CE from the second wireless device based on a transmission of the at least one of the plurality of related MAC-CEs, wherein the response MAC-CE corresponds to an activation of the MAC-CE transmitted to the second wireless device.

Aspect 2 is the apparatus of aspect 1, further including a transceiver coupled to the at least one processor.

Aspect 3 is the apparatus of any of aspects 1 and 2, further includes that the at least one of the plurality of related MAC-CEs indicates that a single related MAC-CE is transmitted.

Aspect 4 is the apparatus of any of aspects 1-3, further includes that the at least one of the plurality of related MAC-CEs indicates that multiple related MAC-CEs are transmitted.

Aspect 5 is the apparatus of any of aspects 1-4, further includes that each of the plurality of related MAC-CEs provides an index for a respective one of the plurality of related MAC-CEs.

Aspect 6 is the apparatus of any of aspects 1-5, further includes that the at least one of the plurality of related MAC-CEs indicates timing information about transmission of the plurality of related MAC-CEs.

Aspect 7 is the apparatus of any of aspects 1-6, further includes that the at least one of the plurality of related MAC-CEs indicates path information for each of the plurality of related MAC-CEs.

Aspect 8 is the apparatus of any of aspects 1-7, further includes that the at least one of the plurality of related MAC-CEs indicates for the second wireless device to send the response MAC-CE in response to receiving a particular one of the plurality of related MAC-CEs or to send the response MAC-CE in response to receiving each of the plurality of related MAC-CEs.

Aspect 9 is the apparatus of any of aspects 1-8, further includes that the at least one processor is further configured to receive the response MAC-CE indicating reception of the particular one of the plurality of related MAC-CEs.

Aspect 10 is the apparatus of any of aspects 1-9, further includes that the first wireless device receives a plurality of response MAC-CEs from the second wireless device.

Aspect 11 is the apparatus of any of aspects 1-10, further includes that if the plurality of related MAC-CEs are transmitted, a corresponding response MAC-CE for each of the plurality of related MAC-CEs corresponds to the activation of each of the plurality of related MAC-CEs.

Aspect 12 is the apparatus of any of aspects 1-11, further includes that the activation of each of the plurality of related MAC-CEs occurs at a same time or at a different time.

Aspect 13 is the apparatus of any of aspects 1-12, further includes that the response MAC-CE identifies the particular one of the plurality of related MAC-CEs on which the response MAC-CE is based.

Aspect 14 is the apparatus of any of aspects 1-13, further includes that at least one of the plurality of related MAC-CEs is transmitted on a second path of the plurality of paths.

Aspect 15 is a method of wireless communication for implementing any of aspects 1-14.

Aspect 16 is an apparatus for wireless communication including means for implementing any of aspects 1-14.

Aspect 17 is a computer-readable medium storing computer executable code, where the code when executed by a processor causes the processor to implement any of aspects 1-14.

Aspect 18 is an apparatus for wireless communication at a second wireless device including at least one processor coupled to a memory and configured to receive at least one of a plurality of related MAC-CEs from a first wireless device, wherein the at least one of the plurality of related MAC-CEs indicates a number of the plurality of related MAC-CEs that are transmitted; and transmit a response MAC-CE to the first wireless device based on a reception of the at least one of the plurality of related MAC-CEs, wherein the response MAC-CE corresponds to an activation of the at least one of the plurality of related MAC-CEs received by the second wireless device.

Aspect 19 is the apparatus of aspect 18, further including a transceiver coupled to the at least one processor.

Aspect 20 is the apparatus of any of aspects 18 and 19, further includes that the at least one of the plurality of related MAC-CEs indicates that a single related MAC-CE was transmitted.

Aspect 21 is the apparatus of any of aspects 18-20, further includes that the at least one of the plurality of related MAC-CEs indicates that multiple related MAC-CEs are transmitted.

Aspect 22 is the apparatus of any of aspects 18-21, further includes that the at least one of the plurality of related MAC-CEs provides an index for a respective one of the plurality of related MAC-CEs.

Aspect 23 is the apparatus of any of aspects 18-22, further includes that the at least one of the plurality of related MAC-CEs indicates timing information for transmission of the plurality of related MAC-CEs.

Aspect 24 is the apparatus of any of aspects 18-23, further includes that the at least one of the plurality of related MAC-CEs indicates path information for each of the plurality of related MAC-CEs.

Aspect 25 is the apparatus of any of aspects 18-24, further includes that the at least one of the plurality of related MAC-CEs received from the first wireless device indicates for the second wireless device to send the response MAC-CE in response to receiving a particular one of the plurality of related MAC-CEs or to send the response MAC-CE in response to receiving each of the plurality of related MAC-CEs.

Aspect 26 is the apparatus of any of aspects 18-25, further includes that the second wireless device sends the response MAC-CE in response to receiving the particular one of the plurality of related MAC-CEs.

Aspect 27 is the apparatus of any of aspects 18-26, further includes that the second wireless device transmits a plurality of response MAC-CEs.

Aspect 28 is the apparatus of any of aspects 18-27, further includes that if the plurality of related MAC-CEs are transmitted, a corresponding response MAC-CE for each of the plurality of related MAC-CEs corresponds to the activation of each of the plurality of related MAC-CEs.

Aspect 29 is the apparatus of any of aspects 18-28, further includes that the activation of each of the plurality of related MAC-CEs occurs at a same time or at a different time.

Aspect 30 is the apparatus of any of aspects 18-29, further includes that the response MAC-CE identifies a particular one of the plurality of related MAC-CEs that triggered the response MAC-CE.

Aspect 31 is a method of wireless communication for implementing any of aspects 18-30.

Aspect 32 is an apparatus for wireless communication including means for implementing any of aspects 18-30.

Aspect 33 is a computer-readable medium storing computer executable code, where the code when executed by a processor causes the processor to implement any of aspects 18-30.

What is claimed is:

1. An apparatus for wireless communication at a first wireless device, comprising:
a memory; and
at least one processor coupled to the memory and configured to:

transmit at least one of a plurality of related medium access control-control elements (MAC-CEs) to a second wireless device based on a determination of at least a first path of a plurality of paths to transmit the at least one of the plurality of related MAC- CEs, wherein the at least one of the plurality of related MAC-CEs indicates a number of the plurality of related MAC-CEs transmitted by the first wireless device, wherein the at least one of the plurality of related MAC- CEs indicates that multiple related MAC-CEs are transmitted; wherein the at least one of the plurality of related MAC-CEs indicates for the second wireless device to send a response MAC-CE in response to receiving a particular one of the plurality of related MAC-CEs or to send the response MAC-CE in response to receiving each of the plurality of related MAC-CEs; and monitor for the response MAC-CE from the second wireless device based on a transmission of the at least one of the plurality of related MAC-CEs, wherein the response MAC-CE corresponds to an activation of the MAC-CE transmitted to the second wireless device.

2. The apparatus of claim 1, further comprising a transceiver coupled to the at least one processor.

3. The apparatus of claim 1, wherein the at least one of the plurality of related MAC-CEs indicates that a single related MAC-CE is transmitted.

4. The apparatus of claim 1, wherein each of the plurality of related MAC-CEs provides an index for a respective one of the plurality of related MAC-CEs.

5. The apparatus of claim 1, wherein the at least one of the plurality of related MAC- CEs indicates timing information about transmission of the plurality of related MAC-CEs.

6. The apparatus of claim 1, wherein the at least one of the plurality of related MAC- CEs indicates path information for each of the plurality of related MAC-CEs.

7. The apparatus of claim 1, wherein the at least one of the plurality of related MAC-CEs indicates for the second wireless device to send the response MAC-CE in response to receiving the particular one of the plurality of related MAC-CEs or to send the response MAC-CE in response to receiving each of the plurality of related MAC-CEs.

8. The apparatus of claim 1, wherein the at least one of the plurality of related MAC-CEs indicates for the second wireless device to send the response MAC-CE in response to receiving each of the plurality of related MAC-CEs.

9. The apparatus of claim 1, wherein the at least one processor is further configured to:
receive the response MAC-CE indicating reception of the particular one of the plurality of related MAC-CEs.

10. The apparatus of claim 9, wherein the first wireless device receives a plurality of response MAC-CEs from the second wireless device.

11. The apparatus of claim 10, wherein the response MAC-CE identifies the particular one of the plurality of related MAC-CEs on which the response MAC-CE is based.

12. The apparatus of claim 1, wherein if the plurality of related MAC-CEs are transmitted, a corresponding response MAC-CE for each of the plurality of related MAC-CEs corresponds to the activation of each of the plurality of related MAC-CEs.

13. The apparatus of claim 12, wherein the activation of each of the plurality of related MAC-CEs occurs at a same time or at a different time.

14. The apparatus of claim 1, wherein at least one of the plurality of related MAC-CEs is transmitted on a second path of the plurality of paths.

15. A method of wireless communication at a first wireless device, comprising:
- transmitting at least one of a plurality of related medium access control-control elements (MAC-CEs) to a second wireless device based on a determination of at least a first path of a plurality of paths to transmit the at least one of the plurality of related MAC-CEs, wherein the at least one of the plurality of related MAC-CEs indicates a number of the plurality of related MAC-CEs transmitted by the first wireless device, wherein the at least one of the plurality of related MAC- CEs indicates that multiple related MAC-CEs are transmitted; wherein the at least one of the plurality of related MAC-CEs indicates for the second wireless device to send a response MAC-CE in response to receiving a particular one of the plurality of related MAC-CEs or to send the response MAC-CE in response to receiving each of the plurality of related MAC-CEs; and
- monitoring for the response MAC-CE from the second wireless device based on a transmission of the at least one of the plurality of related MAC-CEs, wherein the response MAC- CE corresponds to an activation of the MAC-CE transmitted to the second wireless device.

16. The method of claim 15, further comprising:
receiving the response MAC-CE indicating reception of the particular one of the plurality of related MAC-CEs.

17. An apparatus for wireless communication at a second wireless device, comprising:
- a memory; and
- at least one processor coupled to the memory and configured to:
- receive at least one of a plurality of related medium access control-control elements (MAC-CEs) from a first wireless device, wherein the at least one of the plurality of related MAC-CEs indicates a number of the plurality of related MAC-CEs that are transmitted, wherein the at least one of the plurality of related MAC-CEs indicates that multiple related MAC-CEs are transmitted; wherein the at least one of the plurality of related MAC-CEs received from the first wireless device indicates for the second wireless device to send a response MAC-CE in response to receiving a particular one of the plurality of related MAC-CEs or to send the response MAC-CE in response to receiving each of the plurality of related MAC-CEs; and
- transmit the response MAC-CE to the first wireless device based on a reception of the at least one of the plurality of related MAC-CEs, wherein the response MAC-CE corresponds to an activation of the at least one of the plurality of related MAC-CEs received by the second wireless device.

18. The apparatus of claim 17, further comprising a transceiver coupled to the at least one processor.

19. The apparatus of claim 17, wherein the at least one of the plurality of related MAC-CEs indicates that a single related MAC-CE was transmitted.

20. The apparatus of claim 17, wherein the at least one of the plurality of related MAC-CEs provides an index for a respective one of the plurality of related MAC-CEs.

21. The apparatus of claim 17, wherein the at least one of the plurality of related MAC-CEs indicates timing information for transmission of the plurality of related MAC-CEs.

22. The apparatus of claim 17, wherein the at least one of the plurality of related MAC-CEs indicates path information for each of the plurality of related MAC-CEs.

23. The apparatus of claim 17, wherein the at least one of the plurality of related MAC-CEs received from the first wireless device indicates for the second wireless device to send the response MAC-CE in response to receiving the particular one of the plurality of related MAC-CEs or to send the response MAC-CE in response to receiving each of the plurality of related MAC-CEs.

24. The apparatus of claim 17, wherein the at least one of the plurality of related MAC-CEs received from the first wireless device indicates for the second wireless device to send the response MAC-CE in response to receiving each of the plurality of related MAC-CEs.

25. The apparatus of claim 17, wherein the second wireless device sends the response MAC-CE in response to receiving the particular one of the plurality of related MAC-CEs.

26. The apparatus of claim 17, wherein the second wireless device transmits a plurality of response MAC-CEs.

27. The apparatus of claim 17, wherein if the plurality of related MAC-CEs are transmitted, a corresponding response MAC-CE for each of the plurality of related MAC-CEs corresponds to the activation of each of the plurality of related MAC-CEs.

28. The apparatus of claim 27, wherein the activation of each of the plurality of related MAC-CEs occurs at a same time or at a different time.

29. The apparatus of claim 17, wherein the response MAC-CE identifies the particular one of the plurality of related MAC-CEs that triggered the response MAC-CE.

30. A method of wireless communication at a second wireless device, comprising:
- receiving at least one of a plurality of related medium access control-control elements (MAC-CEs) from a first wireless device, wherein the at least one of the plurality of related MAC-CEs indicates a number of the plurality of related MAC-CEs that are transmitted, wherein the at least one of the plurality of related MAC-CEs indicates that multiple related MAC-CEs are transmitted; wherein the at least one of the plurality of related MAC-CEs received from the first wireless device indicates for the second wireless device to send a response MAC-CE in response to receiving a particular one of the plurality of related MAC-CEs or to send the response MAC-CE in response to receiving each of the plurality of related MAC-CEs; and
- transmitting the response MAC-CE to the first wireless device based on a reception of the at least one of the plurality of related MAC-CEs, wherein the response MAC-CE corresponds to an activation of the at least one of the plurality of related MAC-CEs received by the second wireless device.

* * * * *